US007016521B1

(12) United States Patent
Florent (10) Patent No.: US 7,016,521 B1
(45) Date of Patent: Mar. 21, 2006

(54) IMAGE PROCESSING METHOD AND SYSTEM, AND MEDICAL EXAMINATION APPARATUS, FOR EXTRACTING A PATH FOLLOWING A THREADLIKE STRUCTURE IN AN IMAGE

(75) Inventor: Raoul Florent, Valenton (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 596 days.

(21) Appl. No.: 09/587,394

(22) Filed: Jun. 5, 2000

(30) Foreign Application Priority Data

Jun. 4, 1999 (EP) .................................. 99401348

(51) Int. Cl.
G06K 9/00 (2006.01)
G06K 9/62 (2006.01)
G06K 9/48 (2006.01)
G06K 9/68 (2006.01)
G06K 9/70 (2006.01)

(52) U.S. Cl. ...................... 382/128; 382/156; 382/197; 382/226

(58) Field of Classification Search ................ 382/197, 382/202, 226, 128, 156, 157, 158; 600/407; 128/920

See application file for complete search history.

(56) References Cited

U.S. PATENT DOCUMENTS

| | | | |
|---|---|---|---|
| 4,052,620 A * | 10/1977 | Brunnett .................... 378/97 |
| 4,566,124 A * | 1/1986 | Yamamoto et al. ......... 382/185 |
| 4,692,864 A * | 9/1987 | Shimoni et al. ............ 600/443 |
| 4,866,629 A * | 9/1989 | Chen et al. ................. 700/95 |
| 4,875,165 A * | 10/1989 | Fencil et al. ............... 345/424 |
| 5,067,166 A * | 11/1991 | Ito ............................ 382/215 |
| 5,293,574 A * | 3/1994 | Roehm et al. ............. 378/98.2 |
| 5,432,712 A * | 7/1995 | Chan ......................... 382/191 |
| 5,666,469 A * | 9/1997 | Lee ............................ 706/46 |
| 6,278,918 B1 * | 8/2001 | Dickson et al. .............. 701/23 |

OTHER PUBLICATIONS

Cohen et al., "Global Minimum for Active Contour Models: A minimal Path Approach," IEEE, 1997, pp. 1-39.*
"A fast marching level set method for monotonically advancing fronts" by J.A. Sethian in Proc. Natl. Ad. Sci, USA, vol. 93, pp. 1591-1595, Feb. 1996, Applied Mathmatics.
"Global Minimum for Active Contour Models: A Minimal Path Approach" by Laurent D. Cohen and Ron Kimmel, in International Journal of Computer Vision 24(1), 57-78(1997), pp. 57-78.

* cited by examiner

Primary Examiner—Joseph Mancuso
Assistant Examiner—Shefali Patel (57) ABSTRACT

An image processing method of extracting the points of a path following a threadlike structure in an image (IP) formed by a grid of Potential points. A first processing step (4) implements a first path-tracking operation using a front marching technique denoted Filiation Front Marching Technique (FFM) for supplying at least one First Track of the threadlike structure, formed by succeeding points denoted Fathers and Children, by marching a Front of points forwards from a fixed Start point (A) to a fixed End point (B). A second processing step (5) implements a second path-tracking operation using the Filiation Front Marching Technique for supplying a Best Path from one First Track by back propagating the Front starting at the End Point and going through already determined Children and Fathers until the Start Point is reached.

14 Claims, 3 Drawing Sheets

IMAGE PROCESSING METHOD AND SYSTEM, AND MEDICAL EXAMINATION APPARATUS, FOR EXTRACTING A PATH FOLLOWING A THREADLIKE STRUCTURE IN AN IMAGE

FIELD OF THE INVENTION

The invention relates to an image processing method of extracting the points of a path following a threadlike structure represented in an image. The invention more particularly relates to an image processing method of extracting the points representing a catheter guide-wire in an X-ray fluoroscopic medical image or thin vessels in an angiogram. The invention also relates to an image processing system and to a medical examination apparatus such as an X-ray apparatus having a system for image processing.

The invention is applied to medical imaging systems and to the industry of X-ray medical examination apparatus.

BACKGROUND OF THE INVENTION

A method to determine an object contour, referred to as minimal path, between two fixed end points in a 2-D image, is disclosed in the publication "Global Minimum for Active Contour Models: A minimal Path Approach" by Laurent D. COHEN and Ron KIMMEL, in International Journal of Computer Vision 24(1), 57–78 (1997). This method proposes a technique of boundary detection of objects for shape modeling in 2-D images. This method particularly aims at solving the boundary detection problem by mapping it into a global minimum problem and by determining a path of minimal length from the solution of that global minimum problem. The method guarantees that a global minimum of energy is found by minimizing curves between two end points. This method implements a step of (1) manually selecting a start point and an end point in an object contour region of a gradient image, (2) a step of propagating a front, in the totality of the gradient image, starting at the start point, in such manner that this front propagates at lower cost in regions of high gradient values until the end point is reached to thereby determine a cost map that is a totally convex surface having a single minimum and (3) a step of back-propagating from the end point towards the start point by the steepest gradient descent in the totally convex surface to thereby provide a minimal path between the start and end points.

This publication includes by reference a front propagation technique disclosed in a publication entitled "A fast marching level set method for monotonically advancing fronts" by J. A. SETHIAN in Proc. Nat. Acad. Sci., USA, Vol. 93, pp. 1591–1595, February 1996, Applied Mathematics. According to the reference, a front, formed in a 2-D grid of potential values, is propagated using a "Fast Marching Technique" with a determination of the front points. The front is a solution of a so-called Eikonal Equation. The Fast Marching Technique introduces order in the selection of the grid points and sweeps the front ahead in one pass on the 2-D image. The Fast Marching Technique implements a marching of the Front outwards by freezing already visited points denoted Alive, coming from a set of points referred to as Narrow Band, and by bringing new ones denoted Far Away into the Narrow Band. The Narrow Band grid points are always updated as those having minimal potential values in a neighboring structure denoted Min-Heap and the potential of the neighbors are further re-adjusted.

The method known from COHEN's publication constructs the convex surface of the cost map using the Fast Marching technique, which provides respectively one path of minimal cost joining the start point to each respective point of the front, said the front propagating until the end point is reached. Then, the minimal path is provided by back-propagating from the end point to the start point by the steepest gradient descent in the convex surface. The numerous paths constructed by propagating the front forwards and joining the start point to the different points of the front for forming the convex surface are no longer taken into account. Even the path joining the start point to the end point, in the operation of forwarding the front, is not the steepest gradient descent in the back-propagation operation.

So, the final path obtained by this known method does not have points extracted by tracking. Neither does it have points of a path constructed by front propagation.

Besides, it is interesting to note that the points of a path constructed in the operation of marching the front forwards are points which have the smallest possible potentials. Starting at the start point, and going forwards from one point to the next point must be at the "minimal cost". So, such a path is a path of "minimal Action", i.e. a path on which the "Sum" or the "Integral" of potentials calculated over point potentials is the smallest, though strictly continuously growing as a function of the number of points present on the path between the start point and the current point on the front.

A first problem in extracting a threadlike structure is that the threadlike structure may be represented in the original image by a number of thin linear segments which are not joined in a strictly continuous manner, having "holes" between them and which are to be found among a great number of other thin unrelated structures, referred to as false alarms. A second problem is that the threadlike structure may be very long and sinuous, so that it may be far from a straight line and may even present U-turns along its length, and that it may be formed by a great number of points.

On the one hand, a path constructed using the front propagation technique described in the known publication is not adapted to solve these problems, due to the fact that the front propagation is based on an "Action", i.e. a "Sum" of potentials effectuated along the constructed path. Because the threadlike structure is very long, this Sum of potentials will soon become very large on a path following the threadlike structure. When the Sum becomes large, the cost becomes high, and, for minimizing costs, the known front marching technique may generate a path based on the nearest false alarms in order to follow as few points as possible. So, the known front marching technique may generate a path which is far from following the sinuous and long threadlike structure.

On the other hand, the minimal path obtained by the above described minimal path method is a smoothed path, which may not possibly provide extracted points strictly following a long and sinuous threadlike structure.

SUMMARY OF THE INVENTION

The present invention has for an object to provide an automatic image processing method performed between two predetermined end points for supplying a path strictly following a long sinuous threadlike structure. The invention particularly has for its object to provide such a method of processing an original image of such a long and sinuous ill-represented threadlike structure and of false alarms and to provide extracted points of the threadlike structure as a continuous linear structure of points denoted path, suitable for improving the visualization of the threadlike structure.

It is also an object of the invention to provide a medical examination apparatus using an image processing system to carry out this method and to process medical images.

Advantages of the method are that it is automatic, robust and reliable, it accurately and securely follows the long sinuous threadlike structure without looking for a shorter path and without providing holes and false alarms, it is less calculation-time consuming than the known front marching technique, it may be applied to construct 3-D images from 2-D data and it is implemented with simple structural configurations. An advantage of the apparatus is that the visualization is improved of thin long structures in a medical image, such as a guide-wire in an angiography image for instance, or brain vessels.

BRIEF DESCRIPTION OF THE DRAWINGS

The invention is described hereafter in detail with reference to diagrammatic figured, wherein.

DESCRIPTION OF PREFERRED EMBODIMENTS

The invention first relates to an image processing method based on a path-tracking operation performed between two fixed end points for supplying a path strictly following a long sinuous threadlike structure represented on a background in a digital image. In particular, the invention relates to an image processing method of path-tracking the points representing a catheter guide-wire in an X-ray fluoroscopy medical image. In another particular application, the invention may relate to the path-tracking of thin brain vessels which have a threadlike shape. The invention also relates to a system implementing the method and to an X-ray medical examination apparatus having such a system and means for image processing and image visualization.

In the first particular case of guide-wire path-tracking, the medical image may be an X-ray static arteriogram image representing at least a blood vessel with a guide-wire. In cardiology, such an image may be used to present medical data related to the blood vessel for further medical procedures. The medical procedures using catheter deeply rely on the correct visibility of the guide-wire which is a metallic wire introduced in the vessel for guiding the catheter. An image processing operation of path-tracking this guide-wire in an arteriogram image, that is the detection and location of the points belonging to the guide-wire, can serve several highly interesting purposes. For example, a binary extraction mask may be constructed from the path-tracking operation thus increasing visibility, in order to improve the practitioner's ability to determine medical data. After a complete extraction of the guide-wire points, the guide-wire tip can be located and an area of interest may be defined around this tip. This enables further local processing for better visibility enhancement of a tool called stent introduced in the vessel for its enlargement. In the second particular case, the medical image may be an angiogram of the brain where the vessels have been made as visible as possible by injection of a contrast fluid into the patient. The brain angiogram contains very thin vessels which may be very difficult to visualize. The method according to the invention permits the practitioner to better visualize the vessels. In both cases, the data may alternately be used to construct 3-D images.

The present path-tracking operation uses a Front Marching technique referred to herein as Filiation Front Marching technique denoted FFM, which is not based on a "Sum" or an "Integral of potentials" to go from one point to another, as known from the state of the art, but which instead is based on terms of "Weighted Sums of Potentials". It is to be noted that the "Weighted Sums of Potentials" correspond to calculated terms of "Cumulated Costs", which may not be growing strictly continuously. This property of strictly continuous growing, which exists in the terms of "Sums" or "Integrals" of the Prior Art technique, no longer exists in the terms of "Cumulated Costs" of the present path-tracking operation. So, according to the present Filiation Front Marching technique, the result is that the property of relying on the construction of a minimal path no longer exists. Actually, the path tracking operation based on the FFM technique aims at providing a "Best Path which is not bound to be the "Minimal Path". The "Best Path" is defined as the path that is validated by using the FFM technique described hereafter.

Now, the FFM technique first implements a definition of a function of Cumulated Costs associated to each processed point, which is based on the Potentials of the processed points and which is especially adapted to path-tracking long sinuous threadlike structures. Such a function formed by terms of Cumulated Costs is no longer strictly growing, thus the cost map which may be constructed from these terms of Cumulated Costs is no longer exactly convex, and the required path is no longer allowed to be obtained by the simple steepest descent from the End point to the Start point. Using this function of Cumulated Costs, the Best Path found may not be minimal. Moreover, this FFM technique is not based on the known Eikonal Equation used in the prior art, but, instead, is based on a specific "Distance" for defining a distance relationship establishing a direct filiation between consecutive points which belong to a path and which are denoted "Father and Child".

The path-tracking operation using the FFM technique implements an initializing phase of setting end points for the required Best Path, denoted Start and End Points, which are defined in an image of Potentials. Using the relation of direct filiation, in a first processing phase of the technique, the front is marched forwards, starting from the Start Point which is referred to as the "Ancestor", until it reaches the End Point which is referred to as the "Last Child". Then, in a second processing phase of the technique, the required Best Path is found by tracking backwards from the Last Child to the Ancestor.

Figure 1:
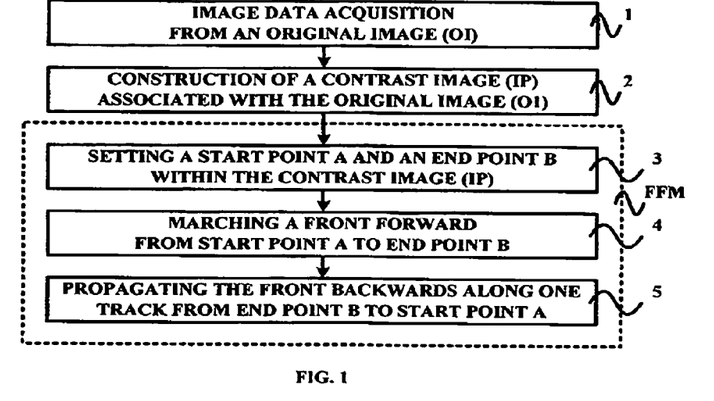
FIG. 1 is a functional block diagram illustrating the main steps of the path-tracking method.

Referring to FIG. 1, which is a functional block diagram illustrating the image processing method for path-tracking a threadlike structure based on the FFM technique, the method implements the following operations.

An operation 1 of image data acquisition from an Original Image denoted OI, for instance a medical image such as a cardiogram including a guide-wire or an angiogram including thin vessels to be extracted; the image data include digital intensity levels referred to as pixel values, and pixel coordinates in the Original Image.

An operation 2 of construction of a contrast image IP in which each pixel of the Original Image is associated to a new calculated intensity level which is taken as a Potential; such an operation may be carried out by any technique known to those skilled in the art for enhancing troughs in the Original Image: for instance, in the cited medical Original Image OI, the objects of interest, either guide-wire or opacified vessels, are darker than the background; so, the Original Image OI is first inverted, then the ridgeness is evaluated by a filtering operations by this filtering operation, for example, the maximum curvature is calculated at each current point as a differential invariant by passing a Gaussian filter then a differential operator, thus providing enhanced ridges in the places of the objects of interest; the filtered image is further again inverted to provide an image referred to as "Image of Potentials" which is the contrast image IP, where the objects of interest are again darker than the background and form thin troughs substantially contrasting with the background.

An initializing phase 3 of setting end points including a Start point A denoted Ancestor and an End point B denoted Last Child between which a path following a given object of interest, that is the threadlike object, is to be determined in the contrast image IP.

A first processing phase 4 of path-tracking using the front propagation technique referred to as the FFM technique, to march a Front forwards from the Start Point A to the End Point B; in the first processing phase 4, marching the Front forwards according to the FFM technique provides First Tracks for the path.

A second processing phase 5 of path-tracking also using the FFM technique, starting at the End Point B considered as the last born Child and propagating the front backwards thus following one First Track backwards in order to come down the First Track, it is necessary and sufficient to follow the filiation from Child to Father and Grandfather until the Ancestor which is the Start point A is reached; it is different from going down the steepest gradient descent of the known convex cost map; the required Best Path is obtained in this second processing phase 5 by the backtracking operation.

Using the FFM technique, the first processing phase 4 of marching the Front forwards has the advantage of not being time consuming because the Front is not wide and does not try many solutions. The second processing phase 5 has the advantage to provide the required Best Path having no holes, including no false alarms and strictly following the thread-like structure. The description of this FFM technique includes first a description of the front construction technique, then a detailed description of the function of terms of Cumulated Costs.

Figure 2A:
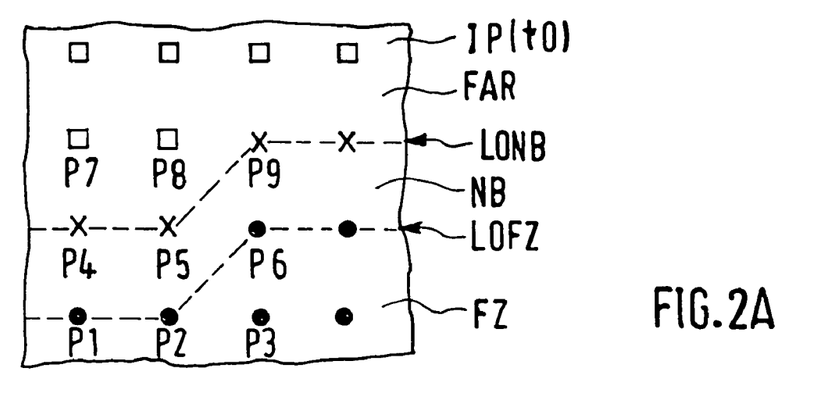
FIGS. 2A to 2C illustrate the front propagation according to the Filiation Front Marching technique in a grid of points.
Figure 2B:
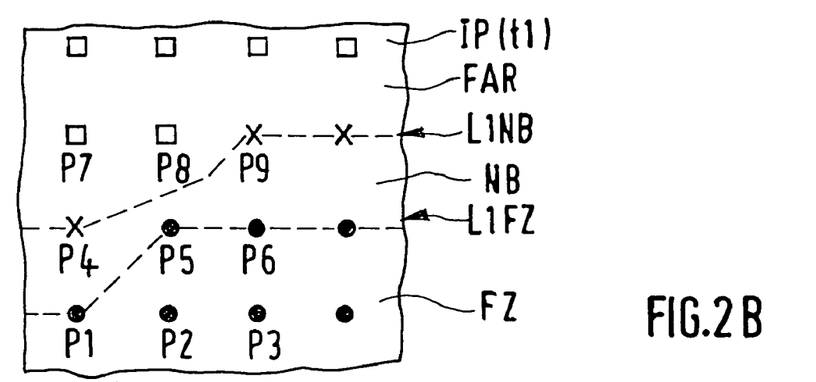
Figure 2C:
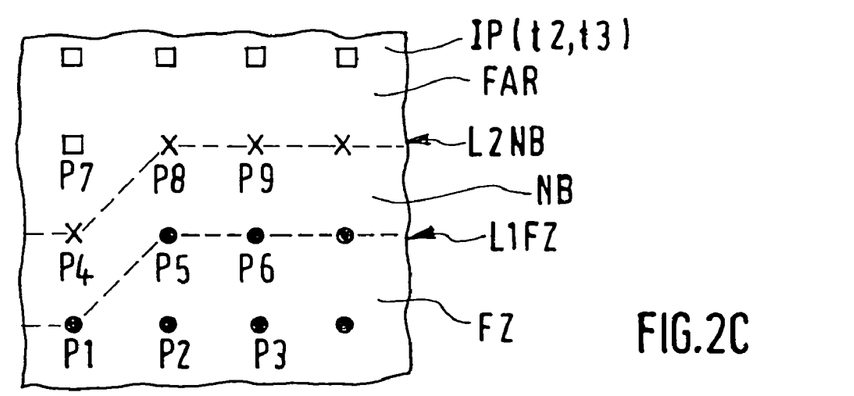

Referring to FIG. 2A to FIG. 2C, the Front according to the FFM technique is constructed in an iterative manner. FIG. 2A to FIG. 2C each represents a grid of points in the Image of Potentials IP constructed in the operation 2 from the Original Image acquired in the operation 1. This Image of Potentials contains the two End Points set in the initializing phase 3, including the Start Point A and the End Point B. An advantageous specific Distance law to be used in this FFM technique is based on the known City Block Distance. The Distance law permits of propagating, on a path constructed by the FFM technique, only along lines or columns of the grid of points, with one grid point interval between two successive points referred to as Father and Child. Also, an advantageous Criterion of costs, which will be further described, provides a function of Cumulated Costs related to a point of the grid called Child, the Criterion taking into account a function of the Cumulated Costs related to the Father of this Child and of the Potential at this Child.

Referring to FIG. 2A, at a certain stage of the front propagation denoted instant t0, the Image of Potentials IP comprises points already visited which are referred to as Frozen Points, located in a zone denoted FZ, and which are represented by dots. These Frozen Points are not allowed to change state, that is to have the name of their location FZ or their associated function of Cumulated Costs modified. This is the reason why they are referred to as Frozen Points. The already propagated front is a set of points including the Start Point A which is the Ancestor and Frozen points forming paths going to the last Frozen Points found before the instant t0. This Frozen zone has an outwards boundary referred to as L0FZ. The interior of the Frozen zone FZ are points labeled Frozen Points and having only neighbors labeled Frozen Points.

Besides the Frozen Points, the image of Potentials IP implements points which are situated in a zone denoted NB, adjacent the Frozen zone, referred to as Narrow Band whose points are represented by crosses. This Narrow Band surrounds the Frozen zone external boundary and has itself a further external boundary denoted L0NB. So, the external boundary L0FZ of the Frozen zone is a set of points labeled Frozen Points having at least one neighbor labeled Narrow Band Point.

The Image of Potentials IP moreover implements points referred to as Far Points represented by small squares, located in a zone denoted FAR, which includes all points external to the Narrow Band and the Frozen zone. So, the external boundary L0NB of the Narrow Band is a set of points labeled Narrow Band Points having at least one neighbor labeled FAR Point.

According to this FFM technique, an operation of examining a point of the Narrow Band, considered a Child, is performed. The Father of this point must be a point of the Frozen zone which is a neighbor of the Child and which is such that the function of Cumulated Costs related to the Child associated to the Father is minimal with respect of other functions of Cumulated Costs which may be calculated for the Child associated to other possible Fathers. For instance, in the example of FIG. 2A, a part of the grid of points is examined. This grid part comprises at this given instant t0:

Points $P_1$, $P_2$, $P_3$, $P_6$ which are in the Frozen zone FZ;

Points $P_9$, $P_4$, $P_5$ which are in the Narrow Band NB;

Points $P_7$, $P_8$ which are in the Far zone FAR.

These points of the grid are examined and, in the example of FIG. 2A, current point $P_5$ is found to present two properties: It is located in the Narrow Band and its function of Cumulated Costs, calculated according to the Criterion which will be further described, is minimal with respect to those of the other points of the Narrow Band. The current point $P_5$ is then selected as the Narrow Band point having the minimal function of Cumulated Costs at this instant t0. According to this FFM technique, the current point $P_5$ having such properties is decreed a possible Father.

Referring to FIG. 2B, at the next instant t1, in the Image of Potential IP, the state of this current point $P_5$ is modified by marching the limit L0FZ of the Frozen zone towards the Narrow Band zone so as to include point $P_5$ in the Frozen zone. The limit is now referred to as L1FZ. Further on, the point $P_5$ is a Frozen point having the function of Cumulated Costs previously determined and is referred to as a Father. Now, according to this FFM technique, it is looked for the only Child of this Father.

Referring to FIG. 2C, at the instant t2 following t1, in the image of Potentials IP, the neighbors of the Father Point $P_5$ are examined. According to the Distance law of the FFM technique, only adjacent points on lines and columns may be neighbors and, unlike the method cited as prior art, the diagonal points are not relevant and are thus not considered. So, according to the Distance law of the FFM technique, in the case illustrated by FIG. 2C as an example, there are four existing neighbors, which are $P_8$, $P_4$, $P_6$, $P_2$. All neighbors must be examined and possibly updated. Their state may be modified, i.e. some of them may become Children:

Neighbors $P_6$, $P_2$ are in FZ. They remain Frozen Points.

Neighbor $P_8$ is in FAR. At this instant t2, the limit of the NB zone is marched towards the FAR zone so as to include this neighbor $P_8$ in the Narrow Band zone according to a new limit L2NB of the Narrow Band, thus filing the hole created in the Narrow Band at the previous instant t1 by marching the Frozen Zone limit forwards to reach the location L1FZ. The Narrow Band preferably does not remain with a hole. At this instant t2, point $P_8$ in the Narrow Band becomes a Child whose Father has to be determined.

Still referring to FIG. 2C, at the instant t3, the Father and the Cumulated Cost of this new Child $P_8$ are determined. The Father of the Child $P_8$ must be the neighbor which is already located in FZ and which has the smallest related function of Cumulated Costs. Only point $P_5$ answers these conditions because it has been selected as having the smallest function of Cumulated Costs according to the result of the calculation of the Criterion as explained in relation to FIG. 2B. So this Frozen Point $P_5$ may be decreed to be the Father of Child $P_8$. Now, a new function of Cumulated Costs is to be calculated for this Child $P_5$ from the further described Criterion, which takes into account the function of Cumulated Cost of the Father $P_5$ and the Potential at the Child.

Neighbor $P_4$ is in NB. It remains in NB. Until instant t3 this point $P_4$ of the Narrow Band has had a Father and a related function of Cumulated Costs which have been determined at a given previous instant. Let this previous function of Cumulated Costs be denoted $CC_1$ and this previous Father be for example $P_1$ of the Frozen zone FZ. For searching the Father of this Child $P_4$, the points located in the Far zone are not relevant points, the points having infinite costs. Point $P_2$ is in a diagonal position with respect to Child $P_4$, so $P_2$ is not relevant. Thus, only $P_1$ and $P_5$ may be possible Fathers.

At the following instant t4, it is investigated whether the point $P_5$ may be a better Father for its neighbor $P_4$ than the previous Father $P_1$ of the Child point $P_4$ of the Narrow Band. To that end, a new function of Cumulated Costs denoted $CC_2$ is calculated for this Child $P_4$, taking into account that this point $P_5$ may be a Father of $P_4$. For that purpose, this new $CC_2$ takes into account the function of Cumulated Costs related to the possible Father $P_5$ and the Potential at the Child $P_4$. Then $CC_1$ and $CC_2$ are compared.

When $CC_2 > CC_1$, it means that it is not interesting to make the required path pass through possible Father $P_5$. So point $P_5$ is not decreed the Father of $P_4$.

When $CC_2 < CC_1$, it is interesting to make the required path pass through Father $P_5$, so the point $P_5$ may be decreed the new Father of the neighbor $P_4$ instead of $P_1$ and $CC_2$. $CC_2$ is the new function of Cumulated Cost related to the Child $P_4$ associated to the Father $P_5$.

The Criterion giving the function of Cumulated Costs $CC_k$ related to a given current point $P_k$ is a function of the sum of the minimum among the Cumulated Costs of the neighbors of the current point $P_k$ and the Potential at the point. According to the present FFM technique, since the cost related to the current point is calculated from the Minimum "Min" of a number of Cumulated Costs constituted by the Cumulated Costs of its neighbors located at one grid interval on the same line or column, the Argument "Arg" of the minimum "Min" supplies the location of the point referred to as "Father" of the current point $P_k$ which is the last one to go out of the Narrow Band.

The Father of the current point $P_k$ is the last point to go out of the Narrow Band in order to become a Frozen Point. The next FAR Point becomes a Narrow Band Point. This former FAR point had an infinite Cost. It must be attributed a new function of Cumulated Cost. The point that is the last one to go out of the Narrow Band gives its function of Cumulated Cost to its neighbor FAR Point and becomes its possible Father.

The function of Cumulated Cost $CC_k$ may preferably be determined by the Criterion described hereafter providing a robust and reliable value. This Criterion is described in two examples of Techniques referred to as $CC_k$ First Calculation Technique and $CC_K$ Second Calculation Technique, which is a refined version of the First Calculation Technique.

The First Calculation Technique to compute $CC_k$ takes into account that the track between the Ancestor and the current point must have on average the lowest Potential value. So this First Technique involves a Potential Mean Value instead of the Potential Sum or Integral known from the State of the Art. According to the Filiation Front Marching Technique, the length of the path between the Ancestor and the current point is calculated by adding 1 each time a Father fathoms a Child. When the Father is located at the above-described City Block Distance denoted Distance $L_k$ from the Ancestor, the Child $P_k$ is located at a Distance $L_k+1$ which may be written as $L_{k+1}$. So, the Distances between the Ancestor and the current points are updated, and the $CC_k$ values are further calculated as follows as a Potential Mean Value (1):

$$CC_k = \frac{1}{L_k} \sum_{j=1}^{j=k} Q_j \qquad (1)$$

where $Q_j$ are the Potentials at the current points located between the Ancestor and point $P_k$.

The previous relation (1) may be written as:

$$CC_k = \frac{(CC_{k+1})(L_{k-1}) + Q_k}{L_k} \qquad (2)$$

Thus, each time a Child is fathomed, the Distance is updated by adding 1, and the new function of Cumulated Cost is calculated from the previous function of Cumulated Cost, the previous Potential and the previous Distance. Unlike the law known from the State of the Art where the paths are associated to the smallest $\Sigma Q_k$, which penalizes the long threadlike structures, according to the invention the paths are associated to the smallest $Q_k$, which favors the long threadlike structures.

Figure 3:
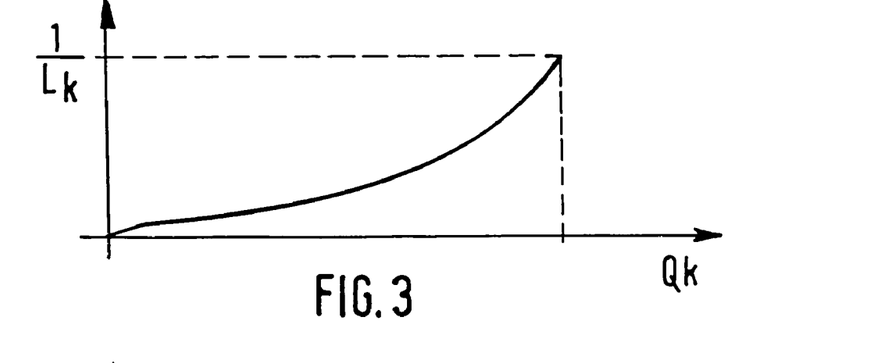
FIG. 3 is a curve of the weight to be assigned to each potential as a function of a number of points along the track determined by the Filiation Front Marching technique from the Ancestor or Start Point to the last found Child or current point.

Referring to FIG. 3, which shows a curve of $CC_k$ versus the potential $Q_k$, where k is the number of points on the path starting from the Ancestor, it is to be noted that the function $CC_k$ is weighted by a constant weight having the value $1/L_k$. Unlike the State of the Art, where the $\Sigma Q_k$ which is used as weighted by a weight 1, according to the invention the function $CC_k$ is weighted by the term $1/L_k$, which depends on length and makes an advantageous correction of the function evaluation. The Distance $L_K$ is the above-described City Block Distance. However, it is to be noted that in relation (2) the potential $Q_k$ has only a small influence on the $CC_K$ value which is a cause of lack of sensitivity to local Potential variations. An advantage is that the sensitivity of the path tracking technique is substantially independent of the path length.

According to the invention, in this First Calculation Technique, the function $CC_k$ is evaluated using first order recursive filters which supply the required Weighted Sum (2).

A second Calculation Technique is described hereafter for solving the problem of lack of sensitivity. Now, in the Second Calculation Technique, the function $CC_k$ is calculated using an average effected of predetermined limited temporal spans defined from the current point, which permits, as the path is progressively constructed, to progressively "forget" the data related to points processed prior to the temporal spans. So, this Technique permits to take Local Events in a given past into account.

For calculating the function $CC_k$, the track is searched first only locally in the best possible direction, taking the Local Events into account. To that end, only the functions of Cumulated Cost related to the points found in a given past are taken into account for calculating the function $CC_k$, while the functions of Cumulated Cost related to points which where found in a longer past are "forgotten". i.e., they are not taken into account. This is obtained using one parameter α which is a weight factor of minimization of the influence of points situated farther away than at a given distance from the current point. This weight factor is applied to the previously described function of Cumulated Costs, where $CC_{K-1}$ is the function of Cumulated Cost related to the Father and $Q_K$ is the Potential at the current point:

$$CC_K = \alpha CC_{K-1} + (1-\alpha)Q_K \tag{3}$$

The α parameter is a constant and fixes the temporal span, and the number of Fathers which is taken into account. The span may be approximated by the relation:

$$1/(1-\alpha) \text{ where } 0<\alpha<1. \tag{4}$$

If α=0.9, the number of Fathers which is taken into account to calculate $CC_k$ is about 10.

If α=0.5, the number of Fathers which is taken into account to calculate $CC_k$ is about 20.

Now, it is not sufficient to take Local Events into account, because the Filiation Front Marching technique may be deceived and may lose the good track. So Global Events must also be taken into account. To that end, the Filiation Front Marching technique takes into account the curvature along the First Track in order to avoid zigzags. It is known to those skilled in the art to calculate the Turning Angle at a current point, and to derive the curvature from the Turning Angle value. The Turning Angle is defined as the angle between the tangent to the track at the current point and a reference axis. Then a term based on the curvature value is taken into account for calculating function $CC_k$ in order to penalize track trajectories that have too many points associated to important curvature values.

The Filiation Front Marching technique according to the invention provides a front propagation which is made discrete by using the City Block Distance law which permits horizontal or vertical increments of value 1, but it does not provide curvature means of calculation means. So, according to the invention, a first-order recursive filter is used to calculate a reliable curvature along the First Track. The filiation law, based on the City Block Distance, gives the distances $DX_k$, $DY_k$ along the lines and the columns, i.e., the x-axis and y-axis, between Father $P_{K-1}$ and Child $P_K$ as:

$$DX_K \in [-1,0,1] \tag{5A}$$

$$DY_K \in [-1,0,1] \tag{5B}$$

Diagonal movements are not allowed. So a Turning Angle is obtained by a calculation based on the value of the ratio DX/DY. A first Turning Angle is calculated relative to the short past and a second Turning Angle is calculated relative to the long past. As an example, the past including 10 Fathers is a short past (SP), the past including 20 Fathers is a long past (LP). So, the distances are given by the relations:

$$DX_{SP(K)} = \beta DX_K + (1-\beta)DX_{SP(K-1)} \tag{6A}$$

$$DY_{SP(K)} = \beta DY_K + (1-\beta)DY_{SP(K-1)} \tag{6B}$$

Figure 4A:
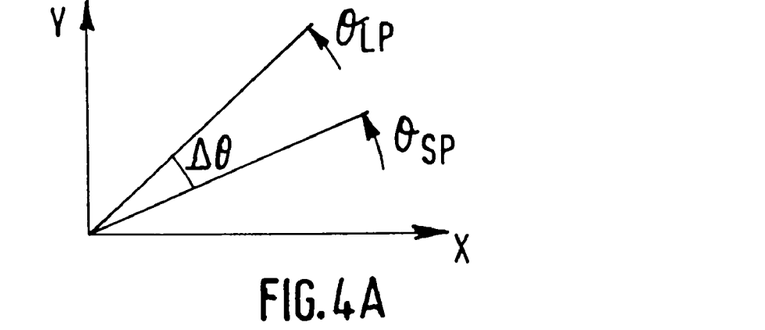
FIGS. 4A and 4B illustrate the calculation of the turning angle at a point of the track for determining the curvature of the path.
Figure 4B:
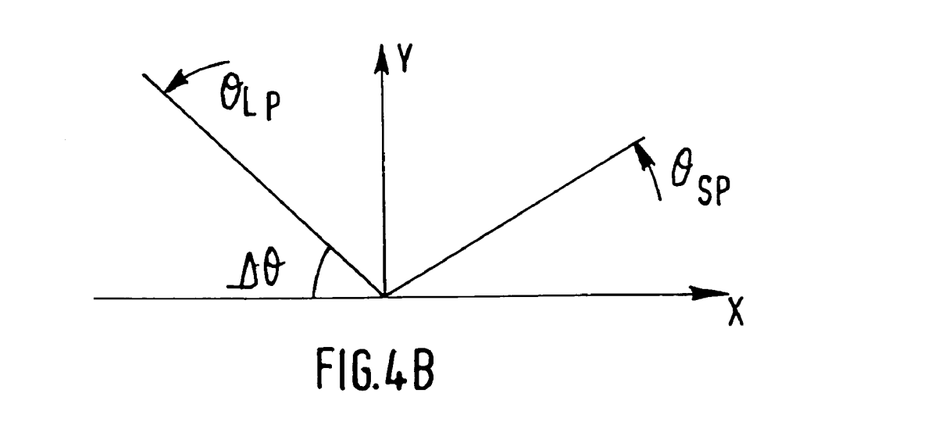

Now, taking into account the long past (LP) to calculate the distances:

$$DX_{LP(K)} = \gamma DX_K + (1-\gamma)DX_{LP(K-1)} \tag{7A}$$

$$DY_{LP(K)} = \gamma DY_K + (1-\gamma)DY_{LP(K-1)} \tag{7B}$$

where $0<\beta<\gamma<1$, and β and γ are constant parameters. Approximately, β=0.1 for 10 Fathers and γ=0.05 for 20 Fathers. From the above relations of $DX_K$ and $DY_K$, 6A, 6B, 7A, 7B, the Turning Angles are calculated at each point, either taking into account the short past SP or the long past LP. These Turning Angles are denoted respectively $\theta_{SP(K)}$, $\theta_{LP(K)}$.

$$\theta_{SP(K)} = atg(DY_{SP(K)}/DX_{SP(K)}) \in [0,\pi] \tag{8A}$$

$$\theta_{LP(K)} = atg(DY_{LP(K)}/DX_{LP(K)}) \in [0,\pi] \tag{8B}$$

from which the curvature $K_K$ is calculated at the current point by a difference of the two Turning Angles relative to short past and long past so as:

$$K_K = |\theta_{LP(K)} \theta_{SP(K)}| \tag{9}$$

as illustrated by FIGS. 4A, 4B showing the possible relative dispositions of $\theta_{SP(K)}$, $\theta LP_{(K)}$ resulting in different possible values of the difference $K_K$.

From the curvature $K_k$, and a new weight W which takes the potential and the curvature into account and may be, for instance, W=0,5, the cost $C_k$ is provided by the following recursive relation $$CC_K = \alpha CC_{k-1} + (1-\alpha)[Q_k + W.K_k] \tag{10}$$

According to the above relation, $CC_k$ is a function of local measures which provide a good sensitivity and of global measures which provide substantially smooth paths. The calculation of $CC_K$ may be carried out by recursive filters for determining the geometry, i.e., locations, and the kinetic, i.e., speed and acceleration, of the points belonging to a given path.

Figure 5:
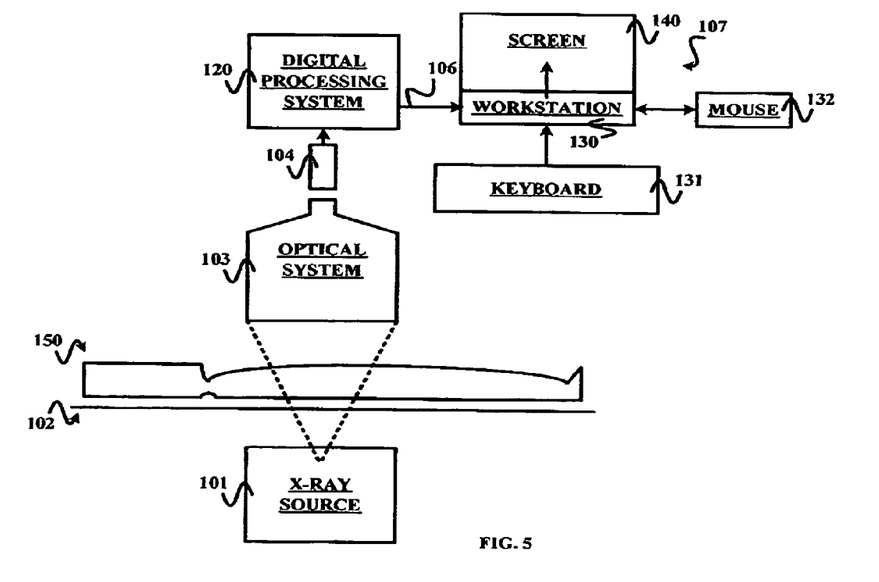
FIG. 5 illustrate an X-ray apparatus having a system for carrying out the method.

Referring to FIG. 5, an X-ray medical examination apparatus 150 employs structure for acquiring digital image data of a medical image, and a digital processing system 120 for processing these data according to the processing method described above. The X-ray apparatus comprises an X-ray source 101, a table 102 for receiving a patient to be examined, an optical system 103, 104 for supplying image data to the processing system 120 which has at least one output 106 to send image data to display and/or storage 107. The display and storage 107 may respectively be the screen 140 and the memory of a workstation 130. The storage 107 may alternately be external to apparatus 150. This image processing system 120 may be a suitably programmed computer of the workstation 130, or a special purpose processor which has a circuit configuration, such as LUTs, Memories, Filters, Logic Operators, which are arranged to perform the functions of the method steps according to the invention. The workstation 130 may also employ a keyboard 131 and a mouse 132.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An image processing method of extracting points of a path following a threadlike structure in an image formed by a grid of potential points, the image processing method comprising:
    marching a front of points forward starting at a predetermined start point until a predetermined end point of the grid is reached to thereby identify at least one track formed by succeeding points denoted fathers and corresponding children of the threadlike structure; and
    back propagating the front along a first track starting at the end point through the children and the fathers of the first track until the start point is reached whereby the points of the path following the threadlike structure in the image are extracted.

2. The method of claim 1, wherein the marching the front of points forward starting at the predetermined start point until the predetermined end point of the grid is reached includes:
    conditionally selecting a first child of the grid to succeed a first father of the grid.

3. The method of claim 2,
    wherein the first child is conditionally selected in accordance with a location for the first father that pertains to the front, and a first cumulated cost for the first that is minimal compared to other points of the front.

4. The method of claim 2,
    wherein the first child is conditionally selected in accordance with a location for the first child that is on a same row or a same column of the grid as the first father with a one grid point interval, and a second cumulated cost for the first child including a first term of a minimum among cumulated costs of the succeeding points already selected from the start point to the first father and a second term of the potential at the first child.

5. The method of claim 2,
    wherein the first child is conditionally selected in accordance with a filiation that determines the first child becomes a possible second father of the front for further forwarding the front.

6. The method of claim 5,
    wherein a curvature value ($K_k$) at the first child along the first track is derived from a turning angle value which is defined as an angle between the tangent to the track at the first child and a reference axis so that a term based on the curvature value ($K_k$) is taken into account to calculate the function ($CC_k$) of cumulated costs in order to penalize track trajectories having too many points associated to important curvature values.

7. The method of claim 6,
    wherein, from the curvature value ($K_k$) and from a weight factor (W) which takes the potential at the first child and the curvature into account, the function ($CC_k$) of cumulated costs is provided by the following recursive relation $$CC_K = \alpha CC_{K-1} + (1-\alpha)[Q_K + W K_K]. \quad (10)$$

8. The method of claim 2,
    wherein a function of cumulated costs ($CC_k$) associated with the first child is calculated as follows as a potential mean value (1):

$$CC_k = \frac{1}{L_k} \sum_{j=1}^{j=k} Q_j \quad (1)$$

where variable k is the total number of current points between the start point and the first child, ($Q_j$) are the potentials at the current points located between the start point and the first child, and ($L_k$) is a length of a path between the start point and the first father calculated using a city block distance law.

9. The method of claim 8,
    wherein the length of the path between the start point and the first child is calculated using the city block distance law by adding 1 each time any father along the path fathoms a child, so that when the first father is located at a determined distance ($L_k$) from the start point, the first child is located at an updated distance, which is the distance of the first father plus one unity ($L_k+1$, $L_{k+1}$) and so that the function of cumulated costs ($CC_k$) associated with the first child may be written according to relation (2):

$$CC_k = \frac{(CC_{k+1})(L_{k-1}) + Q_k}{L_k} \quad (2)$$

which is a function of cumulated cost for the first child calculated from the function of cumulated cost of the first father ($CC_{k-1}$), the potential at the first child ($Q_k$), and the distance from the start point to the father ($L_{k-1}$).

10. The method of claim 8,
    wherein the function ($CC_k$) of cumulated cost to attribute to the first child is calculated using an average effected on predetermined limited temporal spans which permits a taking of local events into account.

11. The method of claim 10,
    wherein calculating the function ($CC_k$) of cumulated cost using an average effected on predetermined limited temporal spans is obtained using one parameter $\alpha$ which is a weight factor progressively minimizing the influence of points situated farther away than at a given distance from the first child so that the function ($CC_k$) of cumulated costs is given by the following relation (3):

$$CC_K = \alpha CC_{K-1} + (1-\alpha) Q_K \quad (3)$$

where the weight factor $\alpha$ is a constant and fixes the temporal span, and the number of fathers which is taken into account, where $CC_{k-1}$ is the function of cumulated costs related to the first father and $(Q_k)$ is the potential at the current point.

12. The method of claim 11, wherein:
the span may be approximated by the relation:

$$1/(1-\alpha) \text{ where } 0<\alpha<1. \tag{4}$$

13. A system, comprising:
means for acquiring image data from an original image representing a threadlike structure on a background, the image data including digital intensity levels and pixel coordinates in the original image;
means for constructing an image of potentials in which each pixel of the original image is associated to a potential forming a grid of points;
means for setting end points within the image of potentials, the end points including a start point and an end point between which a path following the threadlike structure is to be determined; and
means for marching a front from the start point through points dented as fathers and children to the end point and to subsequently propagate backwards from the end point through each child and father of a first track until the start point is reached.

14. An image processing system of performing a path-tracking operation to extract points of a threadlike structure in an image formed of a grid of potential points from at least one track formed of succeeding points denoted first points (fathers) and corresponding second points (children) of the threadlike structure by marching a front of points forwards, the method comprising:

means for setting a predetermined start point and a predetermined end point in the grid; and
means for propagating the front forwards between the start point and the end point when the following conditions are satisfied for selecting a second point (child) to succeed a first point (father) of the grid to form the track, wherein the conditions include
a first location for the first point (father) which must already pertain to the front, and a criterion of cost for the first point (father) referred to as cumulated costs which must be minimal compared to the cumulated costs of other points of the front,
a second location for the second point (child), which must be on the same row or column of the grid (city block distance) as the first point (father) with one grid point interval, and a criterion of cost referred to as cumulated costs for said second point (child) which must be minimal compared to cumulated costs obtained with other possible first points (fathers), and
a filiation according to which said determined second point (child) becomes a possible further first point (father) of the front for further forwarding the front, said cumulated costs including a term of the minimum among the cumulated costs of the succeeding points already selected from the start point to a so-called first point and a term of the potential at a so-called second point.

\* \* \* \* \*